United States Patent [19]
Wong et al.

[11] Patent Number: 5,847,979
[45] Date of Patent: Dec. 8, 1998

[54] METHOD AND APPARATUS FOR GENERATING AN INITIAL ESTIMATE FOR A FLOATING POINT RECIPROCAL OF A SQUARE ROOT

[75] Inventors: Roney S. Wong, Sunnyvale; Hei T. Fung, Campbell, both of Calif.

[73] Assignee: Samsung Electronics Company, Ltd., Seoul, Rep. of Korea

[21] Appl. No.: 741,994

[22] Filed: Oct. 31, 1996

[51] Int. Cl.[6] .................................................. G06F 7/552
[52] U.S. Cl. ...................... 364/748.06; 364/752
[58] Field of Search ..................... 364/752, 748, 364/715.01, 765, 761, 736, 754, 715.03, 748.06

[56] References Cited

U.S. PATENT DOCUMENTS

| | | | |
|---|---|---|---|
| 3,610,904 | 10/1971 | Kumagai | 364/752 |
| 3,631,230 | 12/1971 | Chen | 364/716.02 |
| 4,484,259 | 11/1984 | Palmer et al. | 364/754 |
| 4,823,301 | 4/1989 | Knierim | 364/761 |
| 4,999,801 | 3/1991 | Katsuno | 364/748 |
| 5,036,482 | 7/1991 | Saini | 364/760 |
| 5,046,038 | 9/1991 | Briggs et al. | 364/765 |
| 5,159,566 | 10/1992 | Briggs et al. | 364/752 |
| 5,206,823 | 4/1993 | Hesson | 364/748 |
| 5,222,037 | 6/1993 | Taniquchi | 364/748 |
| 5,249,149 | 9/1993 | Cocanougher et al. | 364/748 |
| 5,268,857 | 12/1993 | Chen et al. | 364/752 |
| 5,293,558 | 3/1994 | Narita et al. | 364/752 |
| 5,305,248 | 4/1994 | Ammann | 364/748 |
| 5,459,681 | 10/1995 | Harrison et al. | 364/736 |
| 5,515,308 | 5/1996 | Karp et al. | 364/748 |
| 5,537,345 | 7/1996 | Nakano | 364/752 |
| 5,539,684 | 7/1996 | Quintana et al. | 364/748 |
| 5,563,818 | 10/1996 | Agarwal et al. | 364/748 |
| 5,627,773 | 5/1997 | Wolrich et al. | 364/715.03 |

*Primary Examiner*—Paul P. Gordon
*Assistant Examiner*—Robert J. Dolan
*Attorney, Agent, or Firm*—Skjerven, Morrill, MacPherson, Franklin & Friel, LLP; Mark Zagorin

[57] ABSTRACT

An initial estimate of a reciprocal of a square root of a floating point number is generated by subtracting the input floating point number from a constant and shifting the results to the right by one bit. Additionally, the initial estimate of a reciprocal of a square root of a floating point number can be determined by decrementing the exponent by one, shifting the exponent and fraction to the right by one bit, and subtracting the result from predetermined constant. The estimate for the reciprocal square root can also be determined by shifting the floating point number to the right by one bit and subtracting the shift result from a predetermined number to generate the initial estimate.

38 Claims, 4 Drawing Sheets

METHOD AND APPARATUS FOR GENERATING AN INITIAL ESTIMATE FOR A FLOATING POINT RECIPROCAL OF A SQUARE ROOT

BACKGROUND OF THE INVENTION

1. Field of the Invention

The present invention relates to computer arithmetic and more particularly to determination of an initial estimate for a reciprocal of a square root of a floating point number.

2. Description of the Related Art

Certain applications, e.g., three dimensional graphics processing, use vectors normal to a surface for rotation and shading. The unit normal vector $\vec{U}$ is defined as $$\frac{V}{|V|} \text{ where } \frac{1}{|V|} = \frac{1}{\sqrt{V_1^2 + V_2^2 + V_3^2}}.$$

Thus, particular signal processing applications require determinations of a reciprocal of a square root. Algorithms such as the Newton-Raphson algorithm, which is a well known iterative approach to solving equations, can provide good performance in determinations of a reciprocal of a square root, as the accuracy of each succeeding iteration approximately doubles. Such algorithms, however, require an initial guess or estimate. The better the initial guess, the faster the Newton-Raphson algorithm (or other iterative approaches) will converge to the correct solution.

Prior art signal processors, such as the TI TMS320C4X and Motorola DSP96002 utilize a look up table to determine the initial estimate. In such approaches a ROM stores the values of the estimates and is accessed for every estimate. However, in processors performing multiple floating point operations simultaneously, parallel reciprocal square root operations would require accessing multiple look up tables. Such a solution would be costly because it would require additional space on silicon for each additional look-up table ROM. Alternatively, if a single look-up table is used, each floating point operation would wait its turn to access the single look-up table, an approach having obvious disadvantages. Further, even in processors requiring only one lookup table, it would be advantageous to eliminate the look up table ROM both to save space required for the ROM and to reduce the time for instruction execution by eliminating the need to access the look up table for each reciprocal of a square root estimate.

SUMMARY OF THE INVENTION

Accordingly, the invention provides in a first embodiment, a method for determining an initial estimate for a reciprocal of a square root of a floating point number, by providing the floating point number and a predetermined number to a subtraction circuit, subtracting the floating point number from the predetermined number to obtain a first result, and shifting the result to the right by one bit to determine the initial estimate. This provides for an initial estimate for a reciprocal of a square root of a floating point number that has the correct exponent and up to five or more bits of precision in the fraction. Further, the invention provides an estimate without the need for providing a lookup ROM on silicon or the need to access that ROM. In another embodiment, the invention provides method and apparatus to determine the reciprocal square root by shifting the floating point number to the right by one bit and subtracting the shift result from a predetermined number to generate the initial estimate. In another embodiment, the invention provides a method and apparatus for generating an initial estimate for a reciprocal of a square root of a floating point number, by subtracting, using a subtraction circuit, a one from the least significant bit of the exponent to generate a first result. The first result is shifted, in a shift circuit, to provide the first result and the fraction shifted to the right by one bit position to obtain a second result. The second result is subtracted from a predetermined number to obtain the initial estimate for the reciprocal.

These and other aspects of the invention can be best understood with reference to the accompanying drawings and the detailed description of the invention.

DESCRIPTION OF THE PREFERRED EMBODIMENT(S)

Figure 1:
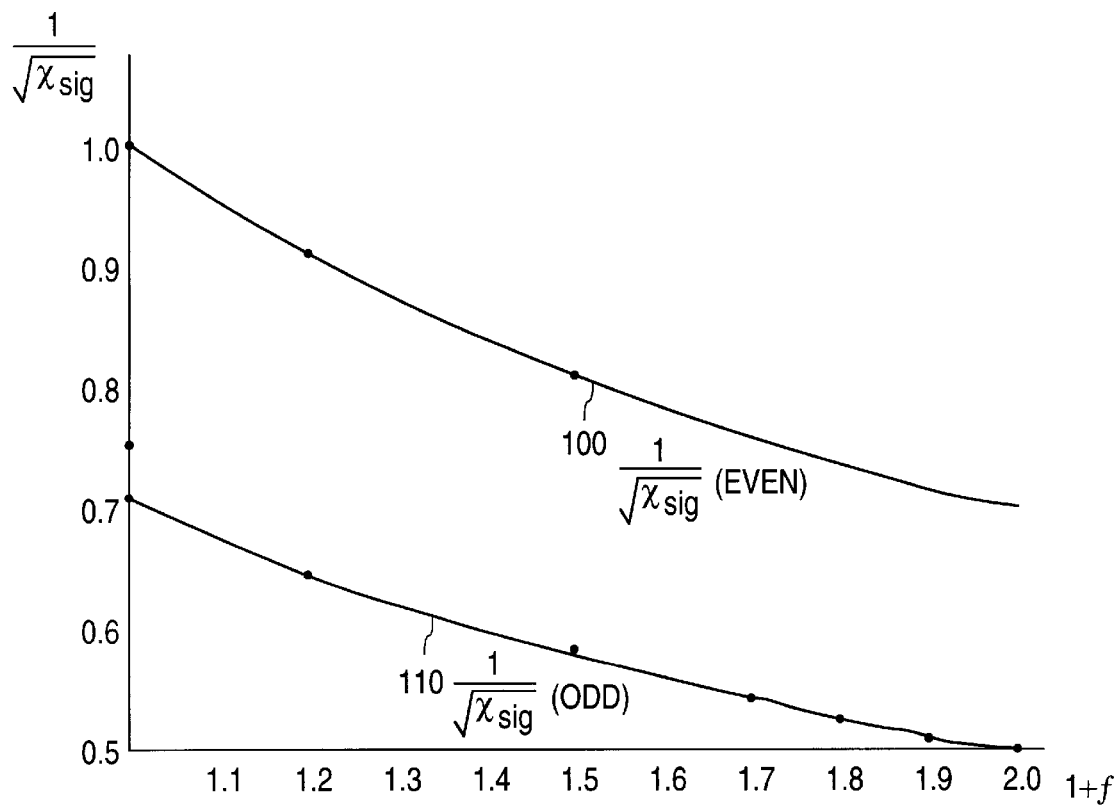
FIG. 1 graphically depicts the significand of the reciprocal square root for even and odd roots.

A floating point number, $x_o$, in IEEE 754 format, is represented in the form, of $x_o = (-1)^S \times 1.f \times 2^E$ (where $f = f_0 f_1 f_2, \ldots f_n$, and where S is a sign bit). That is, the floating point number includes a sign, a significand (1.f) and an exponent (E). For IEEE 754 single precision format, the sign is one bit, the exponent is eight bits and the fraction is twenty three bits. Note that the IEEE format includes a hidden 1 such that the significand always includes 1+ the fraction although the one is not represented. The floating point numbers discussed herein are assumed to be in IEEE 754 single precision format. However, the teachings contained herein are applicable to the other precisions specified in the IEEE standard (e.g., single extended, double, double extended). Additionally, the invention disclosed herein can be modified to accommodate other floating point representations. A related application, by the same inventors, entitled "Method and Apparatus for Generating an Initial Estimate for a Floating Point Reciprocal", filed Oct. 21, 1996, application Ser. No. 08/729,661, is hereby incorporated by reference.

Square roots in general, are taken only of positive numbers. $\sqrt{-x}$ is an imaginary number. Therefore, to generate the estimate of the reciprocal of a square root in IEEE floating point representation, $x_o$ must be a positive floating point number, except in the case of $x_o=0$. In that case, the IEEE 754 standard defines $\sqrt{-0}=0$. That is the only case where a square root of a negative number is defined. In that case, $$\frac{1}{\sqrt{-0}} = \frac{1}{0}$$

which=∞. So there is no need to provide an initial estimate for that one case. Thus, $x_o$ must be a positive floating point number to correctly generate an initial estimate of the reciprocal of the square root.

In general $\sqrt{x^n} = x^{n/2}$. In other words, the exponent is halved. Let $x_o = 1.f_0 f_1 \ldots f_n \times 2^E$. The reciprocal of the square root of $x_o$, $$\frac{1}{\sqrt{x_0}}, \text{ is } \frac{1}{\sqrt{1+f}} \times 2^{-E/2}$$

if E is even. In order to represent an odd reciprocal square root, let $E=2e+1$, $e=(-\infty, \ldots, -1, 0, 1, \ldots \infty)$. For an odd root, $$\frac{1}{\sqrt{x_0}}, = \frac{1}{\sqrt{1+f}} \times \frac{1}{\sqrt{2}} \times 2^{-e}.$$

Thus, if E is odd, the reciprocal square root is smaller by a factor of $$\frac{1}{\sqrt{2}}.$$

Note that this explanation refers generally to the actual value of E, not the value used in IEEE floating point representation, which incorporates a bias. The even and odd square roots can be represented more generally. Let $x_o = (1+f) \times 2^E$ and $x_o > 0$ (always positive)

Let $E = 2e+p$, $e \in$ integer and $p \in \{0,1\}$
Then the reciprocal square root, y, $$= \frac{1}{\sqrt{x_0}} = \frac{1}{\sqrt{1+f}} \times 2^{-e} \times \left(\frac{1}{\sqrt{2}}\right)^p$$

The last term of $$\frac{1}{\sqrt{2}}$$

reduces the reciprocal square root when p is 1, i.e., the exponent is odd. For even roots, p=0, and $$y = \frac{1}{\sqrt{1+f}} \times 2^{-e}.$$

For odd roots p=1, and $$y = \frac{1}{\sqrt{1+f}} \times 2^{-e} \times \frac{1}{\sqrt{2}} \approx 0.707 \left(\frac{1}{\sqrt{1+f}} \times 2^{-e}\right)$$

Stated differently, the reciprocal of a square root of a number with an odd exponent is always equal to $$\frac{1}{\sqrt{2}}$$

times the same fractional number with an even exponent. That is because a number with an odd exponent has its fractional value scaled-up by 2 because the exponent of the odd number was decremented by 1.

The IEEE floating point standard contains an exponent bias of 127, such that the actual value of the exponent is E−127. The bias allows the eight bits of the exponent to represent values from $E_{min}$ of −126 to $E_{max}$ of 127 for normalized single precision floating point numbers. To calculate the exponent of a reciprocal of a square root, consider that the exponent is biased by 127. The floating point representation of the exponent (exp) of the floating point reciprocal has a value of 127−(exp−127)/2=(381−exp)/2. Subtracting (exp−127)/2 represents removing the bias and dividing by 2 and negating the exponent. The first 127 term functions to add the bias back in. Thus, in order to generate an estimate for the exponent of the reciprocal square root, one general approach is to remove the bias on the input exponent, negate the unbiased exponent and add the bias back in.

Calculating (381−E)/2 requires a subtraction and then a right shift of the difference to provide the divide by two of the exponent. It is also possible to subtract 381/2−E2=190−E2, and then adjust the fraction to account for the 1/2 exponent bit in 381/2. Halving the biased exponent, to obtain E/2, can be performed by shifting the exponent one bit to the right.

As discussed, an exponent of a floating point number can be either even or odd. An even exponent in IEEE floating point representation, has the least significant bit (LSB) equal to one because of the bias of 127. An odd exponent has the LSB equal to zero. For floating point operations, as contemplated herein, the exponent must be evenly divisible by two so that the exponent of the square root can be represented.

The range of the significand ($x_{sig}$) of a floating point number, 1.f, is $1 \leq x_{sig} < 2$. If an odd exponent is forced to be even by decrementing the exponent, (e.g., an odd exponent of 7 is decremented to obtain an even exponent of 6), the range of the significand (1.f) is increased because the significand has to be doubled as a result of decrementing the exponent. Thus, when an odd exponent is forced to be an even exponent, the range of the significand (1.f) becomes $2 \leq x_{sig} < 4$. The range of the square root of the adjusted significand (i.e., the significand which was doubled by a left shift of 1 bit) is $\sqrt{2} \leq \sqrt{x_{sig}} < 2$. When the exponent is even and an exponent decrement is not required, the range of the significand remains the same, i.e., $1 \leq sig < 2$, and $1 \leq \sqrt{x_{sig}} < \sqrt{2}$. The reciprocals of the even and odd roots are shown in FIG. 1. The curve 100 shows that the reciprocal of the significand of even exponents varies between 1 and ($1/\sqrt{2}$) as (1+f) varies between 1 and 2. Specifically, the even root reciprocals have a value of $$1 \geq \frac{1}{\sqrt{x_{sig}}} > (1/\sqrt{2})(\approx 0.7071068).$$

For odd exponents, shown in curve 110, the reciprocal of the odd exponent varies between ($1/\sqrt{2}$) and 0.5 as (1+f) varies between 1 and 2. Specifically, $$\frac{1}{\sqrt{2}} \geq \frac{1}{\sqrt{x_{sig}}} > 0.5.$$

The valid range of exponents in IEEE 754 single precision is 1 to 254. An exponent value of 0 is DNORM (denormalized number) and 255 is infinity or NAN (not a number). The range of predicted exponents of a reciprocal of a square root is thus (190−E/2). The largest predicted exponent value is 190−1/2 (when E=1)≈190. The smallest predicted exponent value is 190−254/2=190−127=63. Thus, there is no restriction on exponent range other than the restriction on E being equal to 0 or 255.

Generally, one method contemplated by the invention for determining the reciprocal square root of a floating point number $x_o$, entails generating a guess (g) in the form of (g)=(m−$x_o$)>>1. That means a number m is determined from which the floating point number is subtracted. The result of that subtraction is then shifted to the right to generate the initial estimate. It is necessary to determine an initial estimate for both the exponent and for the fractional part of the reciprocal of the square root. One general approach to determining the exponent has been discussed (i.e., determining 190−E/2). One part of the number m, will be determined in accordance with determining the exponent. The other part of the number m is determined in order to provide an estimate of the fraction. Thus, m is in the form of E'+h, where E' represents a field corresponding to the exponent field of the floating point number and h corresponds to the fraction field of the floating point number. The number m also includes a bit corresponding to the sign bit of a floating point number. Note that m may include a nonzero term in the exponent position.

Figure 2A:
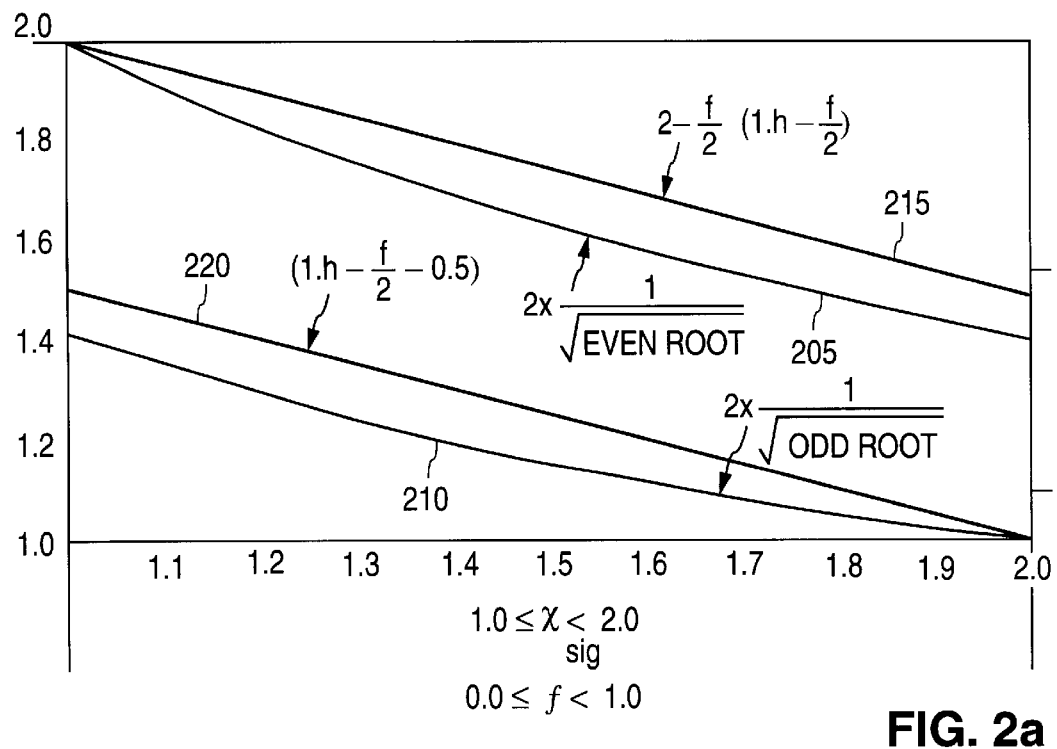
FIG. 2a graphically depicts the significand of the reciprocal square root for even and odd roots and an estimate for each significand.

Referring to FIG. 2a, plots of twice the value of the reciprocals of square roots are shown. Curve 205 represents the even roots and curve 210 represents the odd roots. The fact that the curves are twice the values shown in FIG. 1 is due to the need to represent the numbers in IEEE format which includes the hidden 1. Curve 215 represents a linear approximation of the reciprocal square root curves and has the value of (2−f/2). That can also be represented as (1.h−f/2) where h is the fractional part of the number m. As shown, h is all 1's, but can be adjusted to improve the accuracy of the initial estimate.

Consider that one methodology employed by the instant invention is to provide the floating point initial estimate (g) of the reciprocal of a square root in the form of g=(m−$x_o$) >>1. The effect of the one bit shift can be seen below. The number $x_o$ is represented as:

| s | $e_0 e_1 e_2 e_3 e_4 e_5 e_6 p$ | $f_0 f_1 f_2 \ldots f_{22}$ |
|---|---|---|

The leftmost bit s, is the sign bit. For square root operations s=0 because, as discussed, the estimates require square roots of positive numbers. The exponent field contains the upper seven bits, $e_0$–$e_6$, and p, which is the exponent LSB. In floating point representation, with the bias of 127 included, p=1 for even roots and p=0 for odd roots. The mantissa bits are represented as $f_0$–$f_{22}$.

If $x_o$ is shifted right by 1 bit, then, (x>>1)=

| 0 | $s e_0 e_1 e_2 e_3 e_4 e_5 e_6$ | $p f_0 f_1 f_2 f_3 f_4 \ldots f_{21}$ |
|---|---|---|

Notice that the sign bit, s, shifted into the exponent has a value of 0. The exponent is divided by 2. Remember that dividing E by 2 was one of the steps involved in one determination of the exponent of the initial estimate. Namely, the subtraction step of 381/2−E/2=190−E/2 requires a divide by 2. That divide step is satisfied by the above shift.

The exponent LSB, p, is now the most significant bit of the fraction. Remembering an estimate in the form of 1.h−f2 is desired, shifting the fraction to the right also provides the f/2 term required. For even and odd roots, the mantissa becomes 0.p$f_0 f_1 f_2 \ldots f_{21}$. It is desirable for particular embodiments of the invention, to estimate both the even and odd roots with a same linear approximation having the same slope, where the approximation for the odd root is shifted down from the even root. That is shown in FIG. 2a where curve 220 is seen to be shifted down by 0.5 from curve 215. Because the desired estimate is in the form of 1.h−0.p$f_1 f_2 f_3 \ldots f_{21}$, subtracting p can provide the desired shift. That is because 0.p=$0.5_{10}$, when p=1. Thus, shifting to obtain 0.p$f_0 f_1 \ldots f_{21}$, and then subtracting that result can provide both the divide by 2 and a shift down of 0.5 as shown in FIG. 2a. However, because of the IEEE bias the p bit is 1 for even roots and 0 for odd roots. That would cause the estimate for the even root to be shifted down instead of the estimate for the odd root, which is the opposite of what is desired. The invention contemplates several solutions to that problem.

A three step approach using a subtract/shift/subtract series of operations can be used to generate an initial estimate. The three step approach solves the problem of shifting the wrong root by inverting the p bit. The three steps in more detail are:

(1) Subtract 1 from the exponent. That converts the biased exponent in the IEEE 754 standard's LSB (p bit) back to zero for even roots and forces the LSB of odd roots to one. Thus, subtracting 1 from the exponent in step 1 results in even exponents having a p bit of 0 and odd exponents have a p bit of 1, which provides the correct shift for odd roots and no shift for even roots.

(2) Right shift the decremented exponent and fraction by 1 bit. That provides the divide by two in the exponent and the fraction and moves the p bit into the MSB position in the fraction.

(3) Subtract the right shifted result from the number m.

The steps are explained in more detail in the following. Assume the input floating point number $x_o$ (for which is desired a reciprocal square root) is represented as (1+f)× $2^E$=(1+f)×$2^{2e+p}$. The first step results in E=2e+p−1. $E_{bias}$ (where $E_{bias}$ is the floating point representation of the exponent including the bias)=2e+p+126. When shifted to the right by one, this results in (e+63+(p>>1)). The notation>>1 indicates a shift to the right by one. When p is shifted right by one, p is shifted out of the exponent resulting in (e+63). The value of the exponent of the estimate should equal=− e−1+127=−e+126. That represents the original exponent divided by 2 and negated. The 127 factor is the IEEE bias added back in. The '−1' term accounts for the fact that $$\frac{1}{\sqrt{1+f}}$$

is less than one (except when f=0). Thus, in order to obtain the desired value of (−e+126) when subtracting (m−$x_o$), the E' term of m should be set such that m−x results in −e+126. In other words, $E'−(e+63)=−e+126$ $E'=63+126$ Thus, the E' component of m should be set to 189. Note that this represents an exponent estimate which is one less than the estimate of 190−E/2, previously determined because $$\frac{1}{\sqrt{1+f}}$$

is a number less than one and needs to be normalized (unless f=0). That value is incorporated into m.

In order to determine the fraction component of m better than odd ones, it is necessary to compare the difference $\Delta$ between original estimate of the significand where h is all 1's, (i.e. h is approximately 1) with the actual value. Once an expression for $\Delta$ is determined, taking the first derivative and setting the derivative to 0, will provide a maximum error. The value of h in m can then be chosen to reduce the maximum error.

The derivation of the fraction part of m is explained in more detail below. The three step method generates an initial guess that takes on one of three forms below, depending upon the value of p and the values of f and h. The three step method generates an initial estimate (g), if p=0, which equals $2^{-e-1}(1+h-f/2)$, where the 1 represents the hidden bit in IEEE representation. When p=1, two cases exist. If the fractional part of m, 0.h≧0.pf (the fraction shifted with the p bit in the MSB position), then the value of the initial estimate is $2^{-e-1}(1+h-f/2-1/2)$. The 1/2 term comes from shifting a 1 into the MSB position of the fraction (which is a value of 0.5) and subtracting it. When 0.h<0.pf, the initial estimate=$2^{-e-1}(1+h2-f/4-1/4)$. The fraction is seen to be reduced by half which is caused by the subtraction (h-pf) causing a borrow from the exponent. Note that the hidden 1 does not change, and it is not divided by one half as are the other fraction terms for this case.

The actual value, y, of the reciprocal of the square root, $$= \frac{1}{\sqrt{1+f}} \left(\frac{1}{\sqrt{2}}\right)^p \times 2^{-e}$$

$$= \frac{2}{\sqrt{1+f}} \left(\frac{1}{\sqrt{2}}\right)^p \times 2^{-e-1}$$

The guess $$(g) = \left(1 + h - p - \frac{f}{2}\right) \times 2^{-e-1}.$$

$\Delta$ can now be determined by comparing the actual value y, and the guess g. For even roots, when p=0, $$y = \frac{2}{\sqrt{1+f}} \left(\frac{1}{\sqrt{2}}\right)^0 \times 2^{-e-1}$$

$$= \frac{2}{\sqrt{1+f}} \times 2^{-e-1}$$

The guess $$(g) = \left(1 + h - \frac{f}{2}\right) \times 2^{-e-1}$$

$$\Delta = g - y = 2^{-e-1} \times \left\{1 + h - \frac{f}{2} - \frac{2}{\sqrt{1+f}}\right\}$$

-continued $$\Delta'(\text{ignoring the exponent}) = 1 + h - \frac{f}{2} - \frac{2}{\sqrt{1+f}}$$

$$\Delta_1 = \Delta' = 1 + h - \frac{f}{2} - \frac{2}{\sqrt{1+f}}.$$

For odd roots, p=1. As discussed, there are two cases for odd roots (1) 0.h≧0.pf and (2) 0.h<0.pf. When 0.h≧0.pf, $$y = \frac{2}{\sqrt{1+f}} \left(\frac{1}{\sqrt{2}}\right) \times 2^{-e-1} = \frac{\sqrt{2}}{\sqrt{1+f}} \times 2^{-e-1}$$

$$g = \left(1 + h - \frac{1}{2} - \frac{f}{2}\right) \times 2^{-e-1},$$

$$\Delta = g - y = 2^{-e-1} \times \left\{1 + h - \frac{1}{2} - \frac{f}{2} - \frac{\sqrt{2}}{\sqrt{1+f}}\right\},$$

$$\Delta' = 1 + h - \frac{1}{2} - \frac{f}{2} - \frac{\sqrt{2}}{\sqrt{1+f}},$$

$$\Delta_2 = \Delta' = \frac{1}{2} + h - \frac{f}{2} - \frac{\sqrt{2}}{\sqrt{1+f}}.$$

When 0h<0.pf and p=1, $$y = \frac{\sqrt{2}}{\sqrt{1+f}} \times 2^{-e-1}$$

$$g = \left(1 + 1 + h - \frac{1}{2} - \frac{f}{2}\right) \times 2^{-e-2},$$

Note that the exponent is decremented because of the need to borrow one from exponent for the subtraction.

$$g = \left(2 + h - \frac{1}{2} - \frac{f}{2}\right) \times 2^{-e-2},$$

$$= \left(1 + \frac{h}{2} - \frac{1}{4} - \frac{f}{4}\right) \times 2^{-e-1},$$

$$\Delta = g - y = 2^{-e-1} \times \left\{1 + \frac{h}{2} - \frac{1}{4} - \frac{f}{4} - \frac{\sqrt{2}}{\sqrt{1+f}}\right\},$$

$$\Delta' = 1 + \frac{h}{2} - \frac{1}{4} - \frac{f}{4} - \frac{\sqrt{2}}{\sqrt{1+f}},$$

$$\Delta_3 = \Delta' = \frac{3}{4} + \frac{h}{2} - \frac{f}{4} - \frac{\sqrt{2}}{\sqrt{1+f}}.$$

To reiterate the three values of delta,
When p=0, $$\Delta_1 = 1 + h - \frac{f}{2} - \frac{2}{\sqrt{1+f}}, (0 \leq f < 1)$$

When p=1, and 0.h≧0.pf, $$\Delta_2 = 1 + h - \frac{1}{2} - \frac{f}{2} - \frac{\sqrt{2}}{\sqrt{1+f}}, (\text{valid where } 0 \leq f \leq 2h - 1)$$

When p=1 and 0.h<0.pf, $$\Delta_3 = \frac{3}{4} + \frac{h}{2} - \frac{f}{4} - \frac{\sqrt{2}}{\sqrt{1+f}}, \text{ (valid where } 2h - 1 \leq f < 1)$$

Note that at $$0 \cdot h = 0 \cdot pf \Rightarrow \frac{f}{2} = h - 0.5 \Rightarrow f = 2h - 1$$

$$\Delta' = 1 - \frac{1}{\sqrt{h}} < 0, (\because 0 \leq h < 1).$$

Figure 2B:
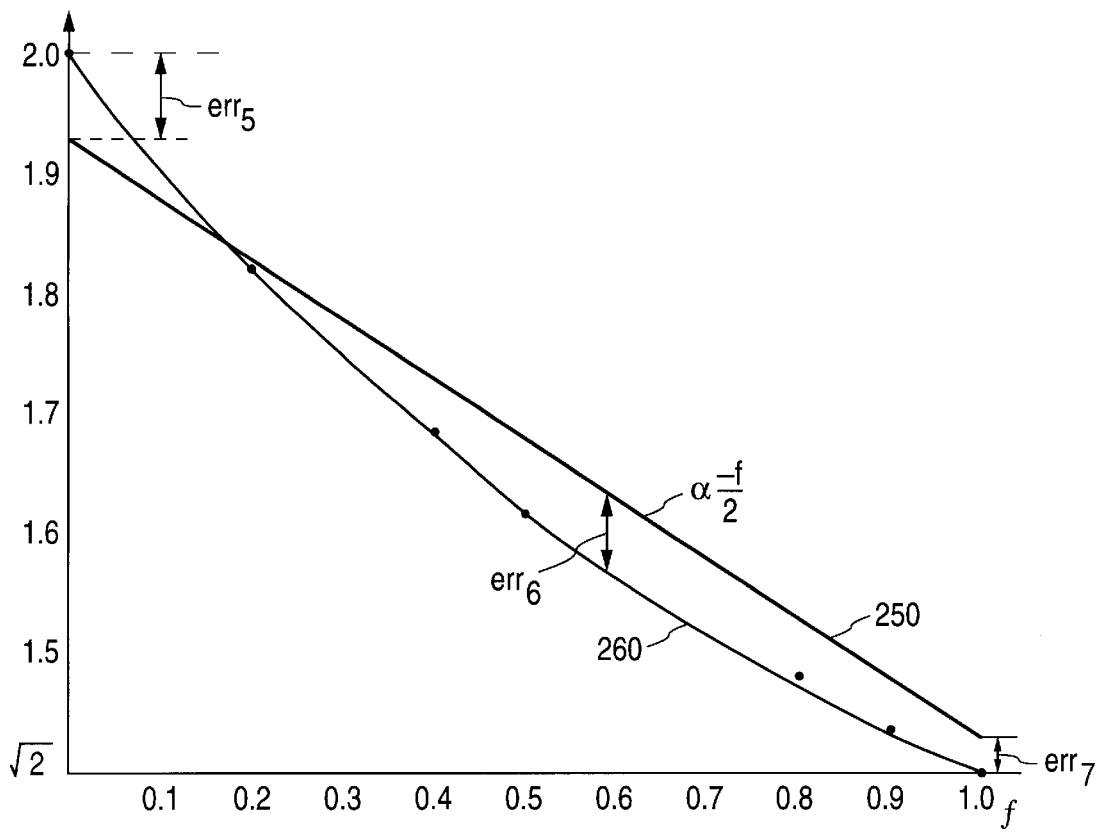
FIG. 2b shows errors contained in the estimate for even roots.
Figure 2C:
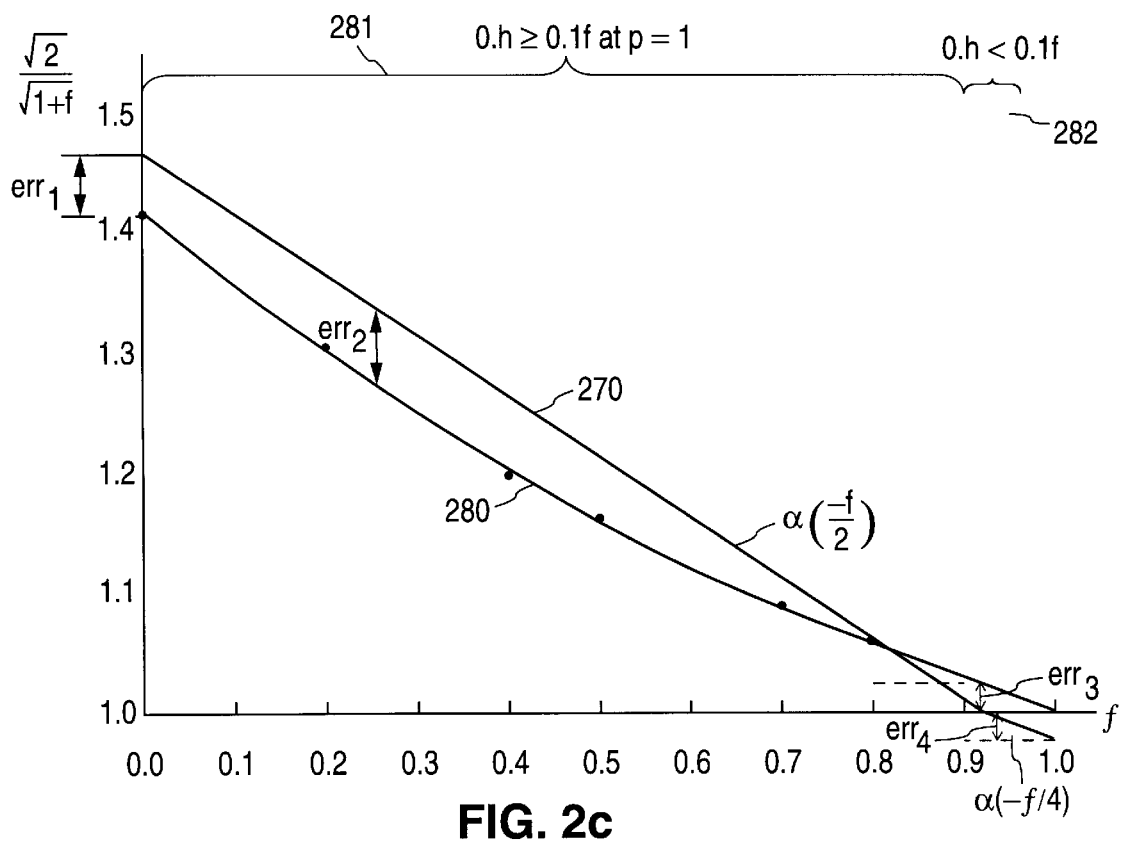
FIG. 2c shows errors contained in the estimate for odd roots.

The errors are graphically depicted in FIGS. 2b and 2c. FIG. 2b shows an estimate 250 for cases where p=0, i.e., for even exponents. The estimate 250 has a slope proportional to −(f/2). The actual value is shown at 260. The errors considered are those where f=0, f=1 and at a maximum error where f=0.587. These errors are designated $err_5$, $err_7$, and $err_6$, respectively.

FIG. 2c shows an estimate 270 where p=1 for the actual value 280. The estimate 270 also has a slope proportional to −(f/2). FIG. 2c is divided into region 281 where 0.h≧0.1f and region 282 where 0.h<0.1f. The errors are evaluated at $err_1$ through $err_4$. Note that in region of 282, the slope of the estimate has changed to being proportional (−f/4). The slope changes when the estimate crosses the x axis.

It is necessary to find an h that balances the errors $err_1$ to $err_7$. The values for the errors are, $err_1 = h - 0.9142135$ at $f=0$
$err_2 = h - 0.8898815$ at $f=0.2599213$ $$err_3 = 1 - \frac{1}{\sqrt{h}} \quad \text{at } f = 2h - 1$$

$$err_4 = \frac{h}{2} - \frac{1}{2} \quad \text{at } f = 1$$

$err_5 = h - 1$ at $f=0$
$err_6 = h - 0.8811016$ at $f=0.5874011$
$err_7 = h - 0.9142135$ at $f=1$ If h is set to =

$$\frac{1 + 0.8811016}{2} = 0.9405508,$$

constrained by $errs_5$ and $errs_6$, then $$err_3 = 1 - \frac{1}{\sqrt{0.9405508}} = -0.0311192, \text{ and}$$

$err_6 = 0.9405508 - 0.8811016, = 0.0594492 > |err_3|$,

Therefore, choosing h=0.9405508 satisfies all constraints on h (i.e., 0.5<h<1) and gives balanced errors for all f and p. In binary, h has a value of 0.1111 0000 1100 0111 1111 000.

The errors for even roots are derived in further detail in the following:

$$\frac{d\Delta_1}{df} = -\frac{1}{2} - 2\left(\frac{1}{2}\right) \frac{1}{(1+f)^{3/2}} = -\frac{1}{2} + \frac{1}{(1+f)^{3/2}}$$

Set $d\Delta_1/df = 0$ to solve for maximum $\Delta_1$.

$$\frac{1}{(1+f)^{3/2}} = \frac{1}{2}$$

$$(1+f)^{3/2} = 2$$

$$1 + f = 2^{2/3}$$

$$f = 2^{2/3} - 1 = \sqrt[3]{4} - 1 \approx 0.5874011$$

$$\Delta'|_{f=0.587} = 1 + h - \frac{0.5874011}{2} - \frac{2}{\sqrt{1.5874011}}$$

$$= h + (1 - 0.2937 - 1.5873) = h - 0.8811016 = err_6$$

$$\Delta'|_{f=0} = 1 + h - 0 - 2 = h - 1 = err_5$$

$$\Delta'|_{f=1} = 1 = h - \frac{1}{2} - \frac{2}{\sqrt{2}} = h + \frac{1}{2} - \sqrt{2} = h - 0.9142135 = err_7$$

The maximum error for an even root is thus h−0.8811016 when h is all ones in binary representation.

The errors for odd roots are derived from:

$$\frac{d\Delta_2}{df} = -\frac{1}{2} + \sqrt{2} \quad \frac{1}{2} \quad \frac{1}{(1+f)^{3/2}} = -\frac{1}{2} + \frac{1}{\sqrt{2}(1+f)^{3/2}}$$

Set $d\Delta_2/df = 0$ to solve for maximum $\Delta_2$ $$\frac{1}{\sqrt{2}(1+f)^{3/2}} = \frac{1}{2}$$

$$2 = \sqrt{2}(1+f)^{3/2}$$

$$(1+f)^{3/2} = \sqrt{2}$$

$$(1+f)^3 = 2$$

$$f = 2^{1/3} - 1 = 0.2599213 \approx 0.260$$

$$\Delta'|_{f=0.260} = 1 + h - 0.5 - \frac{0.2599213}{2} - \frac{\sqrt{2}}{\sqrt{1.2599213}} \approx h + 0.5 -$$

$$0.1299606 - 1.2599209 \approx h - 0.8898815 = err_2$$

$$\Delta'|_{f=0} = 1 + h - 0.5 - \sqrt{2} = h + 0.5 - \sqrt{2} = h - 0.9142135 = err_1$$

Errors for odd roots when h<pf are derived as follows:

$$\frac{d\Delta_3}{df} = -\frac{1}{4} + \sqrt{2} \quad \frac{1}{2} \quad \frac{1}{(1+f)^{3/2}} = -\frac{1}{4} + \frac{1}{\sqrt{2}(1+f)^{3/2}}$$

Set $d\Delta_3/df = 0$ to solve for maximum $\Delta$ $$\frac{1}{\sqrt{2}(1+f)^{3/2}} = \frac{1}{4}$$

$$\sqrt{2}(1+f)^{3/2} = 4$$

$$(1+f)^{3/2} = \frac{4}{\sqrt{2}}$$

$$(1+f)^3 = \frac{16}{2} = 8$$

$$f = 1$$

-continued $$\Delta'|_{f=1} = \frac{3}{4} + \frac{h}{2} - \frac{1}{4} - \frac{\sqrt{2}}{\sqrt{2}} = \frac{h}{2} - 0.5$$

The maximum error for an odd root is $h/2-0.5$, when $h<pf$.

Another value of h can be determined using the following approach: It is desirable to have an h that satisfies both even or odd roots. Given any h that optimizes the estimate for an even root, the estimate for an odd root is $h-0.5$. Plugging $f=h-0.5$ back into the worse case error for odd roots and $h<pf$ $$\Delta'|_{f=h-0.5} = \frac{3}{4} + \frac{h}{2} - \frac{h-0.5}{4} - \frac{\sqrt{2}}{\sqrt{1+h-0.5}}$$

$$= 0.75 + \frac{h}{2} - \frac{h}{4} + 0.125 - \frac{\sqrt{2}}{\sqrt{0.5+h}} =$$

$$\frac{h}{4} + 0.875 - \frac{\sqrt{2}}{\sqrt{0.5+h}}$$

Equating the maximum error of $p=0$ (even root) to the maximum error of $p=1$ (odd root)

$$0.88110158 - h = \frac{h}{4} + 0.875 - \frac{\sqrt{2}}{\sqrt{0.5+h}}$$

$$0.00610158 = 1.25h - \sqrt{\frac{2}{0.5+h}}$$

h=0.9457980
In binary
h=0.1111 0010 0001 1111 1101 0001
Combining h with an exponent adjustment of 189 yields m=0|1011 1101|1111 0010 0001 1111 1101 000= '5EF90FE8' in hexadecimal.
Other values of h can be chosen, e.g., h ranging from 0.8 to one, depending upon the desired precision of the initial estimate.

The following provides an example of this estimation approach for an odd exponent using an m='5EF90FE8'. Assume an input number $$x_0 = 1.01_2 \times 2^3 = 10_{10}, \frac{1}{\sqrt{10}} = 0.3162277.$$

Following the methodology outlined above, in floating point representation,
x=0|1000 0010|010 0000 0000 0000 0000 0000,
with the vertical bars delineating respectively the sign, exponent and fraction. Subtracting one from the exponent results in, 1000 0010−1=1000 0001
Shifting to the right the decremented exponent and the fraction by one bit results in,
0|0100 0000|101 0000 0000 0000 0000 0000='20500000'
  in hexadecimal.
Subtracting that result from m,
  '5EF90FE8'−'20500000'='3EA90FE8'≈1.3203007× $2^{-2}$=0.3302001.
Note that the subtraction is not a floating point subtraction but a 32 bit integer subtraction, where the sign, exponent and mantissa are not considered. The estimate of 0.3302001− the actual result of 0.3162727 gives an error of 0.0139274 or a relative error ((actual value—estimated value)actual value) of approximately 0.0440423. This approach is believed to provide an estimate with an least five bits of precision, including hidden one.

The following provides an example of this estimation approach works for an even exponent. Assume an input number $x_o=1.01_2 \times 2^4 = 20_{10}$. The reciprocal square root, $$\frac{1}{\sqrt{20}} = 0.2236068.$$

Following the methodology outlined above, in IEEE 754 floating point representation,
x=0|1000 0011|010 0000 0000 0000 0000 0000,
Subtracting one from the exponent,
1000 0011−1=1000 0010
Shifting to the right,
0|0100 0001|001 0000 0000 0000 0000 0000='20900000'
  in hexadecimal.
Subtracting that result from m,
  '5EF90FE8'−'20900000'='3E690FE8'≈1.8208007× $2^{-3}$=an estimated value of approximately 0.2276. That compares to an actual value of 0.2236.

It would also be desirable to obtain the estimate in two steps, rather than a subtract/shift/subtract, 3 step operation. One two step approach includes a first step, subtracting $(m-x_o)$ in which the floating point number is subtracted from the number m, and a second step, shifting the result of that subtraction to the right by one bit. These two steps can be described as $(m-x_o)>>1$. The two step approach is described in more detail in the following:

Let $x_o=(1+f)\times 2^{2e+p}$, $0 \le f < 1$, p=0 or 1, $e \in Z$.

In floating point representation,
x=127+(2e+p)|f, where '|' represents the concatenation of the exponent and the fraction. The 127 adds the bias in for IEEE floating point representation. The number, m, from which the floating point number will be subtracted is described as, E', the exponent field of the guess=2e'+p'
m=2e'+p'|h
$m-x_o$, which is the first step,
=(2e'+p'−2e−p−127)|(h−f)
=(2e'−2e−128+1+p'−p)|(h−f)
The second step, which is the shift, $(m-x_o)>>1$,
=((e'−e)+(−64)+((1+p'−p)>>1)|(1+p'−p) (h−f).

The notation ((1+p'−p)>>1) which remains in the exponent, indicates that a value may remain in the exponent after shifting, if, e.g., the expression (1+p'−p) has a value of 2. The 1 term in (1+p'−p) comes from increasing 127 to 128 (so it can be conveniently divided by 2) That results in the need to add 1 back in. Table 1 sets forth the values for p' and p.

TABLE 1

| p' | p | 1 + p' − p |
|---|---|---|
| 0 | 0 | 1 |
| 0 | 1 | 0 |
| 1 | 0 | 2 |
| 1 | 1 | 1 |

Setting p'=0, provides a good solution because it reduces the (1+p'−p) to (1+p), which simplifies the solution by eliminating the case where (1+p'−p) remains in the exponent after shifting.

The guess (g), when g is a binary string representing the exponent and fraction is, =(m-x$_o$)>>1=(e'-e-64+((1-p)>>1)|(1×p) (h-f)
=(e'-e-64)|(1-p) (h-f)

We choose e' such that the guess (g), when g is represented as follows, the choice of e' results in a guess of (g), where $$(g) = 2^{-1-e} \times \left( 1 + \frac{1}{2} (1-p) + \frac{h-f}{2} \right).$$

The actual value, y, of the reciprocal square root, $$y = \frac{1}{\sqrt{x}} = 2^{-e-1} \times \frac{2}{\sqrt{1+f}} \left( \frac{1}{\sqrt{2}} \right)^p$$

As for the three step case, it is necessary to determine the difference, $\Delta$, between the estimate and the actual value.

$$\Delta = g - x = 2^{-e-1} \times \left\{ 1 + \frac{1}{2} (1-p) + \frac{h-f}{2} - \frac{2}{\sqrt{1+f}} \left( \frac{1}{\sqrt{2}} \right)^p \right\}$$

For the case when p=0, and considering only the fractions, $$\Delta' = 1.5 + \frac{h-f}{2} - \frac{2}{\sqrt{1+f}}.$$

Differentiating in terms of f and setting that to 0 provides a maximum error.

d$\Delta$'/df=0⇒f=$2^{2/3}$-1=0.5874011.

For the three values of f shown, $\Delta$ can be determined in terms of h.

$$\Delta'|_{f=0.587} = \frac{h}{2} - 0.38110158$$

$$\Delta'|_{f=0} = \frac{h}{2} - 0.5,$$

$$\Delta'|_{f=1} = \frac{h}{2} + 1 - \sqrt{2} = \frac{h}{2} - 0.4142135$$

Note that the largest possible error occurs at f=0.5874 because h/2 is constant and at that value a smaller number (0.3811) is being subtracted from a constant and thus the error is larger.

For the case when p=1, $$\Delta' = 1 + \frac{h-f}{2} - \frac{\sqrt{2}}{\sqrt{1+f}}.$$

Again, differentiating and setting the result to 0 provides us a location of maximum error.

d$\Delta$'/df=0⇒f=0.2599213. Again three cases are determined.

$$\Delta'|_{f=0.260} = \frac{h}{2} - 0.3898819$$

$$\Delta'|_{f=0} = \frac{h}{2} + 1 - \sqrt{2} = \frac{h}{2} - 0.4142135$$

$$\Delta'|_{f=1} = \frac{h}{2} + 0.5 - 1 = \frac{h}{2} - 0.5$$

The value of h, i.e., the fraction of m, is determined such that $$\frac{h}{2} - 0.38110158 = 0.5 - \frac{h}{2}$$

h = 0.88110158

More precisely
h=(0.1110 0001 1000 111 1110 0000)$_2$

When choosing h at this value, the maximum error is seen to be=0.8811/2-0.3811=0.0594493. The maximum error has the value of 0.0000 1111 0011 in binary representation which represents 5 bits precision. Other values of h may be chosen, e.g. between approximately 0.8 and approximately 1 (where h is all 1's), to provide varying degrees of precision in the initial estimate.

In order to set the exponent in m$_o$ (e'), it is appropriate to set e'-e-64=-1-e+127
e'=126+64=190

Thus, m$_o$=1011 11100|1110 0001 1000 1111 1110 000= BE70C7F0 in hexadecimal.

Therefore, the guess (g)=('BE70C7F0'-x$_o$)>>1.

The following provides an example of the second embodiment of the invention where the exponent is odd. Assume x$_o$=1.5×$2^1$, then $$\frac{1}{\sqrt{x_0}} 0.5773502.$$

This is represented as 0|1000 0000|100 0000 0000 0000 0000 0000 in a floating point binary representation with the sign, exponent, and fraction field delineated by vertical bars. Subtracting that value from ('BE70C7F0') results in, 1|011 1110 0|111 0000 1100 0111 1111 0000–0|100 0000 0|100 0000 0000 0000 0000 0000

0|111 1110 0|011 0000 1100 0111 1111 0000

After right shifting, the estimate becomes,

0|011 1111 0|001 1000 0110 0011 1111 1000

The estimate therefore has the value of approximately, 1.1905516×$2^{-1}$=0.5952758. That compares to the actual value of the square root of the reciprocal, which is 0.5773502.

The following provides a second example of the second embodiment of the invention where the exponent is even. Assume x$_o$=1.5×$2^2$, then $$\frac{1}{\sqrt{x_0}} 0.4082482.$$

This is represented as 0|1000 0001|100 0000 0000 0000 0000 0000 in a floating point binary representation with the sign, exponent, and fraction field delineated by vertical bars. Subtracting (m-x$_o$), 1|0111 1100|111 0000 1100 0111 1111 0000–0|1000 0001|100 0000 0000 0000 0000 0000

0 1111 1011|011 0000 1100 0111 1111 0000

After right shifting, the estimate becomes,

0|0111 1101|101 1000 0110 0011 1111 1000

The estimate therefore has the value of approximately, 1.6905516×$2^{-2}$=0.4226379.

This compares to the actual value of the square root of the reciprocal, which is approximately 0.4082482.

Other embodiments of a two step process are possible. For instance, remembering that the 3 step process consists of:

(1) Subtract 1 from the exponent. In binary format for the format assumed herein, this equals, $x_o$–'00800000', where the 8 is at the LSB of the 'exponent.

(2) Right shift the difference by 1×–'00800000'>>1 becomes x/2–'00400000'

(3) Subtract the right shifted amount from m, so the guess, $$\begin{aligned} g &= m_1 - ((x - \text{'00800000'}) \gg 1) \\ &= m_1 - \left(\frac{x}{2} - \text{'00400000'}\right) \\ &= m_1 + \text{'00400000'} - \frac{x}{2} \\ &= m' - \frac{x}{2} \text{ where } m' = (m + \text{'00400000'}) \\ &= \text{'5EF90FE8'} + 00400000 \\ &= \text{'5F390FE8'} \end{aligned}$$

The 3 step process has now been compressed into 2 step process of dividing the floating point number $x_o$, by two (shift to the right) and subtracting that result from a modified m.

Thus, the guess g=m'–($x_0$>>2) where m'='5F390FE8'. Of course, other values for m besides 5EF90FE8 can be used to determine m'.

There are now two 2 step embodiments:

1. $g_0 = m_0 - (x_0 \gg 2)$ $m_0 \approx$ '5F390FE8'
2. $g_0 = (m_1 - x_0) \gg 2$ $m_1 \approx$ 'BE70C7EF'

In binary format 5F390FE8 is 0101 1111 0011 1001 0000 1111 1110 1000 whereas BE70C7EF is 1011 1110 0111 0000 1100 0111 1110 1111

The upper 15 bits are identical if 5F390FE8<<1

The two m's can be specified as 16 bit numbers with no loss within 5 bits of fractional accuracy.

Figure 3:
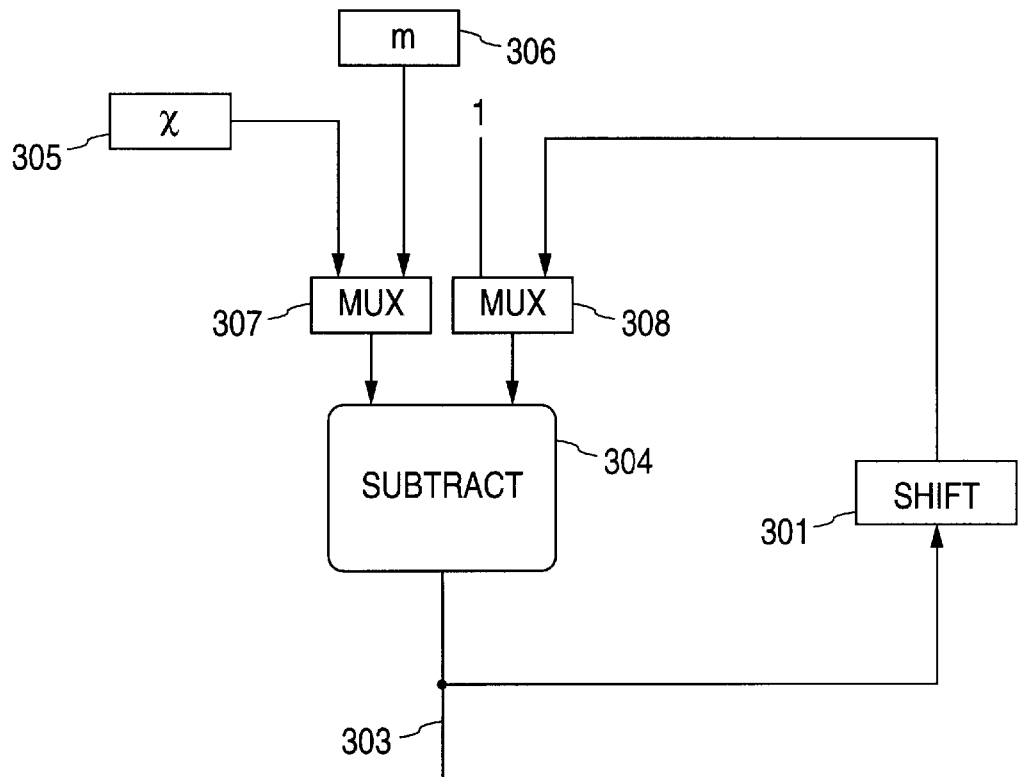
FIG. 3 shows a hardware implementation for one embodiment of the invention.

A hardware implementation of one embodiment of the invention is shown in FIG. 3. The floating point number $x_o$ is stored in register 305. The multiplexers 307 and 308 are controlled to provide the subtraction circuit 304, for the first subtraction operation, with the floating point number and the number one (the one being in a bit position corresponding to the LSB of the exponent) is subtracted from $x_o$ in subtraction circuit 304. Following this subtraction, the results of the subtraction are shifted in shift circuit 301 by one bit and provided back to subtractor 304 through multiplexer 308. The shift circuit 301 may have registers to store the shift result prior to it being provided to the multiplexer, or additional registers may be provided external to the shifter. Subtractor 304 subtracts the results received from shifter 301 from the constant $m_o$ and provides the result 303 as the estimate for the reciprocal of the square root. There are many ways to implement the circuit shown in FIG. 3. For instance, the shift circuit 301 could be incorporated in multiplexer 308 to provide a one bit shift. Many other variations on the circuit would be apparent to one of ordinary skill in the art. Software implementations which perform the same steps as the hardware are also possible.

Figure 4:
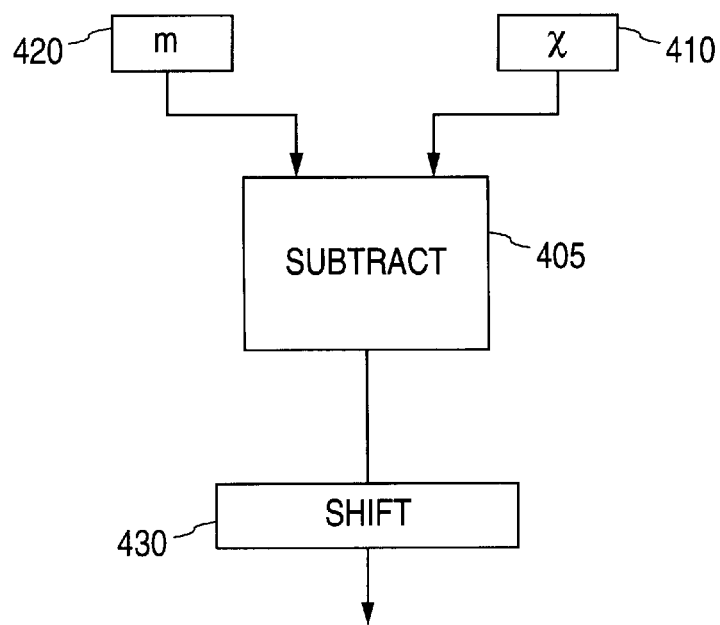
FIG. 4 shows a hardware implementation for a second embodiment of the invention.

A hardware implementation of a second embodiment of the invention is shown in FIG. 4. The floating point number $x_o$ is stored in register 410. The number $m_o$ is stored in register 420. The subtractor 405 subtracts the floating point number $x_o$ from the number m. The shifter 430, then shifts the result to the right by one bit position to generate the estimate of the reciprocal of a square root of a floating point number. Numerous implementations of the circuit shown in FIG. 4 would be known to one of ordinary skill. For instance, the shift circuit 430 could be incorporated in a multiplexer. Software implementations which perform the same steps as the hardware are also possible.

Figure 5:
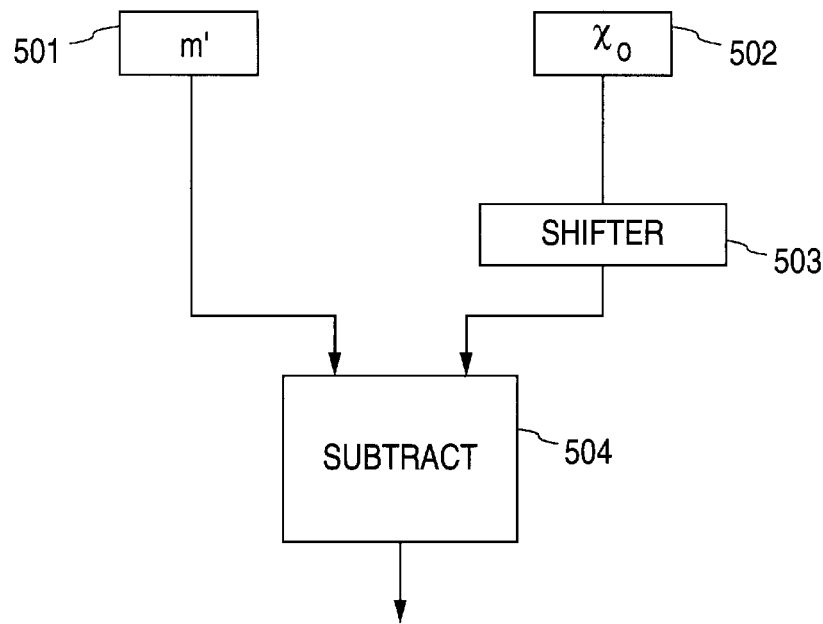
FIG. 5 shows a hardware implementation for a third embodiment of the invention.

A hardware implementation of a third embodiment of the invention, which provides a two step solution for the estimation, is shown in FIG. 5. The floating point number $x_o$ is stored in register 502. The number m' is stored in register 501. Shifter 503 shifts $x_0$ by one bit and provides the shifted results to subtractor 504. The subtractor subtracts the shifted results from m' to generate the initial estimate of the reciprocal of a square root of a floating point number. Numerous implementations of the circuit shown in FIG. 5 would be known to one of ordinary skill. For instance, the shift circuit 503 could be incorporated in a multiplexer. Of course, many subtract circuits are also well known. Software implementations which perform the same steps as the hardware are also possible.

Still another two step embodiment may be utilized to determine an initial estimate for a reciprocal of a square root of floating point number. In this embodiment, two m numbers are utilized, $m_{even}$ and $m_{odd}$. The particular m number utilized is determined by the least significant bit of the exponent of $x_0$. Thus, when the exponent is even, $x_0$ is shifted to divide by two and then subtracted from $m_{even}$. The $m_{even}$ number has to compensate for the fact that because of the bias, a one will be shifted into the MSB of the fraction during the shift and an extra 0.5 will be subtracted during the subtraction step. Thus, $m_{even}$=m+'00400000' which adds a one to the MSB of h, where m may='5EF90FE8', the value determined for the first embodiment. Thus $m_{even}$= '5F390FE8'. For odd exponents, $m_{odd}$ must compensate for the fact that due to the bias, a zero is shifted into the MSB of h, instead of a one which is necessary to shift down the odd estimate appropriately. Accordingly, $m_{odd}$=m– '0040000'='5EB90FE8'. Other values of m can of course be used according to the precision acceptable in the initial estimate.

Figure 6:
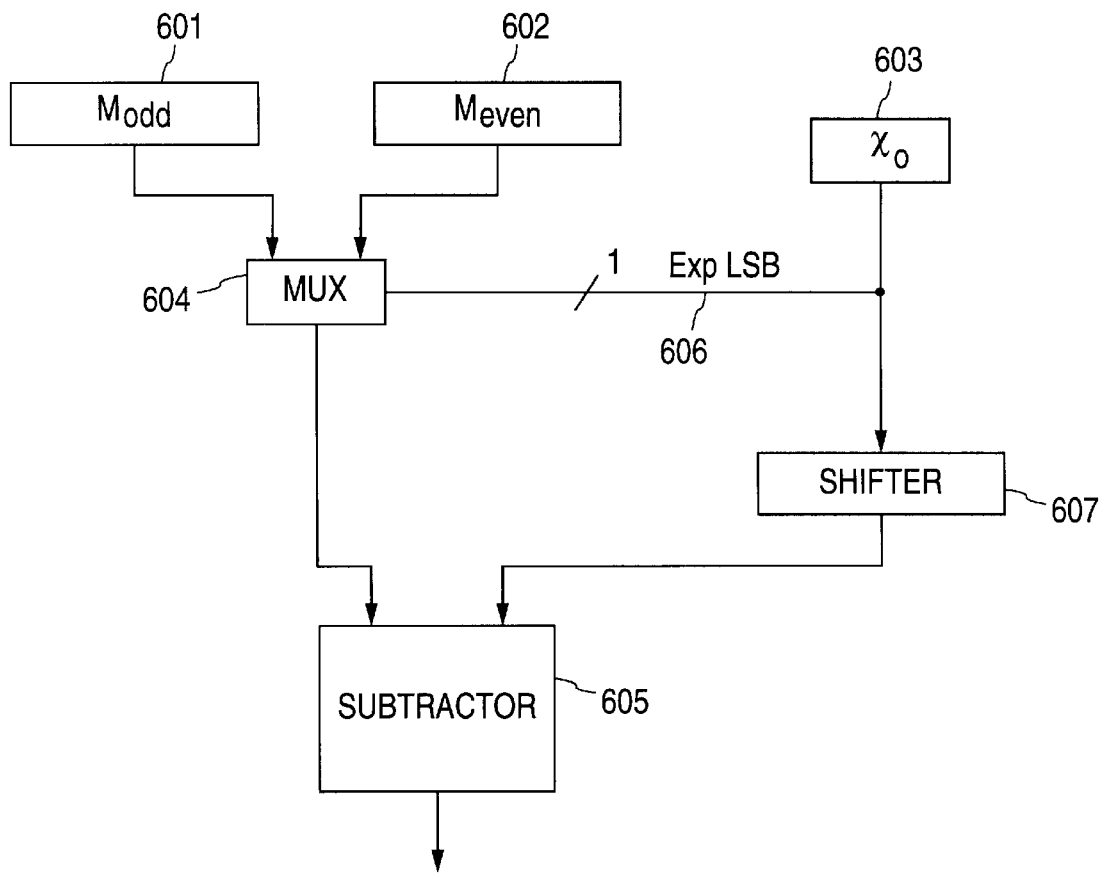
FIG. 6 shows a hardware implementation for a fourth embodiment of the invention.

FIG. 6 shows a hardware embodiment of the two step, two m approach. Registers 601 and 602 contain $m_{odd}$ and $m_{even}$. Register 603 contain $x_0$. The input floating point number $x_0$ is shifted in shifter 607 by one bit and provided to subtractor 605. Multiplexer 604 selects either $m_{even}$ or $m_{odd}$ according to the value of the exponent LSB supplied on 606. Subtractor 605 then subtracts the shifted input number from the m number supplied from multiplexer 604 to generate the initial estimate. Software implementations which perform the same steps as the hardware are also possible.

The description of the invention set forth herein is illustrative, and is not intended to limit the scope of the invention as set forth in the following claims. For instance, the invention is applicable to other floating point representations and to the various floating point formats allowable under IEEE 754. Variations and modifications of the embodiments disclosed herein may be made based on the description set forth herein, without departing from the scope and spirit of the invention as set forth in the following claims.

What is claimed is:

1. A method of determining an initial estimate for a reciprocal of a square root of a floating point number having a fraction, f, and an exponent, E, comprising the steps of:

storing a predetermined number;

subtracting, using a subtraction circuit, the floating point number from the predetermined number to provide a first result; and shifting, in a shift circuit, the first result to the right by one bit position to obtain the initial estimate for the reciprocal.

2. The method as recited in claim 1 wherein the exponent E=2e+p, where p=1 for odd exponents and p=0 for even exponents, and wherein the predetermined number includes an exponent field and a sign field, set at a value to provide an exponent value of (−e−1) for the initial estimate.

3. The method as recited in claim 2 wherein the predetermined number includes a fraction field h, and wherein the initial estimate has a value of approximately $$2^{-1-e} \times \left(1 + \frac{1}{2}(1-p) + \frac{h-f}{2}\right).$$

4. The method as recited in claim 3 wherein h has a value of between approximately one and approximately 0.8.

5. The method as recited in claim 4 wherein the predetermined number is a 32 bit binary number having a hexadecimal value of 'BE70C7' in the most significant bits.

6. A method of determining an initial estimate for a reciprocal of a square root of a floating point number having a fraction, f, and an exponent, E, comprising the steps of:
storing a predetermined number, m';
shifting, in a shift circuit, the floating point number to the right by one bit position to obtain a first result; and
subtracting, using a subtraction circuit, the first result from the predetermined number m' to provide the initial estimate.

7. The method as recited in claim 6 wherein the exponent E=2e+p where p=1 for odd exponents and p=0 for even exponents, and wherein the predetermined number m' is determined by adding a constant to a preliminary predetermined number, m.

8. The method as recited in claim 7 wherein the preliminary predetermined number, m, includes a value in an exponent field and a value in a fraction field, the binary value of the preliminary predetermined number m represented by concatenating the preliminary exponent value with the preliminary fraction value.

9. The method as recited in claim 8 wherein the constant has a 1 in the bit position corresponding to the most significant bit of the fraction field.

10. The method as recited in claim 9 wherein in the preliminary predetermined number m, the fraction field has a value ranging from approximately 1 to approximately 0.8.

11. The method as recited in claim 10 wherein in the predetermined number has a value of '5F390F' in the most significant bit positions.

12. An apparatus for determining an initial estimate for a reciprocal of a square root of floating point number having a fraction, f, and an exponent, E, comprising:
storage locations for the floating point number and a predetermined number;
a subtraction circuit, coupled to the floating point number and the predetermined number, the subtraction circuit providing as a first result, the floating point number subtracted from the predetermined number; and
a shift circuit, receiving the first result, and providing the first result shifted to the right by one bit position to generate the initial estimate.

13. The apparatus as recited in claim 12 wherein the exponent E=2e+p where p=1 for odd exponents and p=0 for even exponents, and wherein the predetermined number includes an exponent field and a sign field, set at a value to provide an exponent value of (−e−1) for the initial estimate.

14. The apparatus as recited in claim 13 wherein the predetermined number includes a fraction field h, and wherein the initial estimate has a value of approximately $$2^{-1-e} \times \left(1 + \frac{1}{2}(1-p) + \frac{h-f}{2}\right).$$

15. The apparatus as recited in claim 14 wherein h has a value of between approximately one and approximately 0.8.

16. The apparatus as recited in claim 15, wherein the predetermined number is a 32 bit binary number having a hexadecimal value of 'BE70C7' in the most significant bit positions.

17. An apparatus for determining an initial estimate for a reciprocal of a square root of floating point number having a fraction, f, and an exponent, E, comprising:
first and second storage locations for the floating point number and a predetermined number;
a shift circuit coupled to the first storage location, receiving the floating point number and outputting the floating point number shifted by one bit as a first result; and
a subtraction circuit, coupled to the shift circuit and the second storage location, the subtraction circuit subtracting, the first result from the predetermined number to provide the initial estimate.

18. The apparatus as recited in claim 17 wherein the exponent E=2e+p where p=1 for odd exponents and p=0 for even exponents, and wherein the predetermined number m' is determined by adding a constant to a preliminary predetermined number.

19. The apparatus as recited in claim 18 wherein the preliminary predetermined number m includes a value in an exponent field and a value in a fraction field, the binary value of the preliminary predetermined number m represented by concatenating the preliminary exponent value with the preliminary fraction value.

20. The apparatus as recited in claim 19 wherein the constant has a 1 in the bit position corresponding to the most significant bit of the fraction field.

21. The apparatus as recited in claim 20 wherein in the preliminary predetermined number m, the fraction field has a value ranging from approximately 1 to approximately 0.8.

22. The apparatus as recited in claim 21 wherein in the predetermined number has a hexadecimal value of '5F390F' in the most significant bit positions.

23. A method of determining an initial estimate for a reciprocal of a square root of a floating point number having a fraction, f and an exponent, E, comprising the steps of:
storing a first and second predetermined number;
selecting one of the first and second predetermined numbers according to a predetermined bit of the exponent;
subtracting, using a subtraction circuit, the floating point number from the selected one of the predetermined numbers to provide a first result; and
shifting, in a shift circuit, the first result to the right by one bit position to obtain the initial estimate for the reciprocal.

24. The method as recited in claim 23 wherein the exponent E=2e+p where p=1 for odd exponents and p=0 for even exponents, and wherein each of the predetermined numbers includes an exponent field, set at a value to provide an exponent value of (−e−1) for the initial estimate.

25. The method as recited in claim 24 wherein the first predetermined number is selected when the exponent of the floating point number is odd and the second predetermined number is selected when the exponent is even.

26. The method as recited in claim 25 wherein each of the predetermined numbers includes a fraction field h, and wherein h has a value of between approximately one and approximately 0.8.

27. An apparatus for determining an initial estimate for a reciprocal of a square root of floating point number having a fraction and an exponent, comprising:

first and second storage locations for a first and second predetermined number;

a shift circuit receiving the floating point number and outputting the floating point number right shifted by one bit as a first result;

a multiplexer circuit, coupled to the first and second storage locations and outputting one of the first and second predetermined numbers according to the value of the least significant bit of the exponent; and a subtraction circuit, coupled to the shift circuit and the multiplexer circuit, the subtraction circuit subtracting, the first result from the selected predetermined number to provide the initial estimate.

28. A method of determining an initial estimate for a reciprocal of a square root of a floating point number having a fraction, f, and an exponent, E, comprising the steps of:

providing a subtraction circuit;

subtracting, using the subtraction circuit, one from the least significant bit of the exponent to generate a first result;

shifting, in a shift circuit, the first result and the fraction to the right by one bit position to obtain a second result; and subtracting the second result from a predetermined number to obtain the initial estimate for the reciprocal.

29. The method as recited in claim 28 wherein, the predetermined number includes an exponent field and a fraction field h, and wherein the exponent E=2e+p, where p=0 for even exponents and p=1 for odd exponents, and wherein the initial estimate has the approximate value of $2^{-e-1}$ (1+h−f/2) when the exponent E is even, and wherein when the exponent E is odd, the initial estimate has the approximate value of one of $2^{-e-1} \times (1+h-f/2-½)$ and $2^{-e-1} \times (1+h/2-f/4-¼)$, according to the value of (h−a fractional part of the second result).

30. The method as recited in claim 29 wherein h has a value of between approximately 1 and 0.8.

31. The method as recited in claim 30 wherein the predetermined number is a 32 bit binary number having a hexadecimal value of '5EF90F' in the most significant bits positions.

32. An apparatus for determining an initial estimate for a reciprocal of a square root of floating point number having a fraction, f, and an exponent, E, comprising:

a first and second multiplexer circuit;

storage locations for the floating point number and for a first and second predetermined number, the floating point number and the second predetermined number being connected to the first multiplexer circuit;

a subtraction circuit, coupled to the first and second multiplexer circuits, receiving the floating point number and the first predetermined number through the first and second multiplexer circuits, and providing as a first result, the first predetermined number subtracted from the floating point number;

a shift circuit, coupled to the subtraction circuit and to the second multiplexer circuit, and providing the first result shifted to the right by one bit position to the second multiplexer circuit as a second result; and the first and second multiplexer circuits providing the subtraction circuit with the second predetermined number and the second result, the subtraction circuit subtracting the second result from the second predetermined number to generate the initial estimate.

33. The apparatus as recited in claim 32 wherein the first predetermined number has a one corresponding to the least significant bit of the exponent E.

34. The apparatus as recited in claim 33 wherein, the second predetermined number includes an exponent field and a fraction field h, and wherein the exponent E=2e+p, where p=0 for even exponents and p=1 for odd exponents, and wherein the initial estimate has the approximate value of $2^{-e-1}$ (1+h−f/2) when the exponent E is even, and wherein when the exponent E is odd, the initial estimate has the approximate value of one of $2^{-e-1} \times (1+h-f/2-½)$ and $2^{-e-1} \times (1+h/2-f/4-¼)$, according to the value of (h−a fractional part of the second result).

35. The apparatus as recited in claim 34 wherein h has a value of between approximately 1 and 0.8.

36. The apparatus as recited in claim 35 wherein the second predetermined number is a 32 bit binary number having a hexadecimal value of '5EF90F' in the most significant bits.

37. An apparatus for determining an initial estimate for a reciprocal of a square root of floating point number having a fraction, f, and an exponent, E, comprising:

means for storing the floating point number and a predetermined number;

means, coupled to the floating point number and the predetermined number, for subtracting the floating point number from the predetermined number to provide a first result; and means, receiving the first result, for shifting the first result by one bit position to the right to generate the initial estimate.

38. An apparatus for determining an initial estimate for a reciprocal of a square root of floating point number having a fraction, f, and an exponent, E, comprising:

means for storing the floating point number and a predetermined number;

means, coupled to the floating point number, for shifting the floating point number by one bit position to the right to generate a first result; and means, coupled to the shifter means and the predetermined number, for subtracting the first result from the predetermined number to provide the initial estimate.

* * * * *